United States Patent
Jean et al.

(10) Patent No.: US 8,670,085 B2
(45) Date of Patent: Mar. 11, 2014

(54) DISPLAY DEVICE HAVING DECREASED BEZEL WIDTH

(75) Inventors: Ki Nam Jean, Gyeongsangbuk-do (KR); Nam Do Son, Gyeongsangbuk-do (KR); Song Ryol You, Gyeonggi-do (KR); Sung Jin Shin, Daegu (KR); Kyeong Tak Baek, Daegu (KR); Seong Rok Kim, Seoul (KR); Dong Yong Kim, Gangwon-do (KR); Min Jae Kim, Jeonju-si (KR)

(73) Assignee: LG Display Co., Ltd., Seoul (KR)

( * ) Notice: Subject to any disclaimer, the term of this patent is extended or adjusted under 35 U.S.C. 154(b) by 328 days.

(21) Appl. No.: 12/981,732

(22) Filed: Dec. 30, 2010

(65) Prior Publication Data

US 2011/0261282 A1 Oct. 27, 2011

(30) Foreign Application Priority Data

Apr. 27, 2010 (KR) .................. 10-2010-0039019
Apr. 27, 2010 (KR) .................. 10-2010-0039021
Apr. 27, 2010 (KR) .................. 10-2010-0039022

(51) Int. Cl.
*G02F 1/1333* (2006.01)

(52) U.S. Cl.
USPC ............................................. 349/58; 349/61

(58) Field of Classification Search
USPC ....................................... 349/58–65
See application file for complete search history.

(56) References Cited

U.S. PATENT DOCUMENTS 7,230,659 B2 6/2007 Ha et al.
7,443,460 B2 * 10/2008 Park ................................ 349/58

(Continued)

FOREIGN PATENT DOCUMENTS

CN 101052284 A 10/2007
CN 101634413 A 1/2010

(Continued)

OTHER PUBLICATIONS

Office Action dated Aug. 28, 2013 from the Taiwan Intellectual Property Office in counterpart Taiwanese application No. 1022115958001. Note: CN 196735 in the CN Office Action is a counterpart to U.S. Appl. No. 7,443,460, which is already of recrod.

(Continued)

*Primary Examiner* — Uyen Chau N Le
*Assistant Examiner* — Michael Mooney
(74) *Attorney, Agent, or Firm* — Morgan, Lewis & Bockius LLP

(57) ABSTRACT

Disclosed is a display device with small thickness and good aesthetic exterior appearance, which comprises a liquid crystal display panel for displaying images; a backlight unit for supplying light to the liquid crystal display panel; and a support member for supporting the liquid crystal display panel and the backlight unit, wherein the support member comprises a set cover for receiving the liquid crystal display panel and the backlight unit, the set cover functioning as an external cover; and a guide frame for guiding the position of the liquid crystal display panel and backlight unit, wherein the guide frame and liquid crystal display panel are connected with each other by a connection member provided therebetween. At this time, the lower and lateral sides of the display device are covered without using upper and external cases to cover the upper edge of display device. Thus, the entire thickness of the display device is decreased; the bezel width of the display device is also decreased; and the entire step coverage of the display device is removed, whereby the front of the display device is recognized as one structure, to thereby allow the good aesthetic exterior appearance of the display device.

19 Claims, 9 Drawing Sheets

(56) References Cited

U.S. PATENT DOCUMENTS

| | | |
|---|---|---|
| 2005/0200770 A1 | 9/2005 | Kuo et al. |
| 2009/0316064 A1 | 12/2009 | Kono et al. |

FOREIGN PATENT DOCUMENTS

| | | |
|---|---|---|
| JP | 11-064844 A | 3/1999 |
| JP | 2003-241209 A | 8/2003 |
| KR | 10-2006-0083029 A | 7/2006 |
| KR | 2008-0067744 A | 7/2008 |
| KR | 2010-0018430 A | 2/2010 |
| TW | 200420965 | 10/2004 |
| TW | 200530696 A | 9/2005 |

OTHER PUBLICATIONS

Office Action dated Jun. 27, 2013 from the Korean Intellectual Property Office in counterpart Korean application Nos. 10-2010-039019 and 10-2010-0039021.

Office Action dated May 23, 2013 from the Chinese Patent Office in counterpart Chinese application No. 201010608842.7.

* cited by examiner

DISPLAY DEVICE HAVING DECREASED BEZEL WIDTH

CROSS REFERENCE TO RELATED APPLICATIONS

This application claims the benefit of the Korean Patent Application Nos. P2010-0039019, P2010-0039021, and P2010-0039022 filed on Apr. 27, 2010, which are hereby incorporated by reference as if fully set forth herein.

BACKGROUND

1. Field of the Invention

The present invention relates to a display device, and more particularly, to a display device with small thickness and good aesthetic exterior appearance.

2. Discussion of the Related Art

Recently, various flat-type display devices, which substitutes for Cathode Ray Tube (CRT) corresponding to an early-stage display device, have been actively developed and researched, for example, Liquid Crystal Display (LCD) device, Plasma Display Panel (PDP), Light Emitting Display (LED) device, and etc.

These flat-type display devices may be manufactured in a large size owing to the decreased weight and volume. Also, the flat-type display devices may be highly developed in quality such as rapid response speed and high-resolution picture image.

In addition to the technical aspects of the flat-type display device, there is the increasing demand for the research and development of design on the flat-type display device. This makes the steady efforts toward minimization in thickness of the display device (for example, slimness), and simultaneously makes the increasing requirement for the satisfactory design which is capable to arouse customer's interest.

However, the existing design for the slimness and good aesthetic exterior appearance of the display device has been developed by changing a structure of components included in the display device under the circumstances that all components are used for the display device. Thus, it makes a limitation in the slimness of the display device and the development of the new design.

For instance, a related art LCD device necessarily uses lower and upper cases to receive a liquid crystal display unit and a backlight unit therein. In addition, an external case is additionally used in the related art LCD device to manufacture a notebook computer, a monitor, a mobile device, or a television.

As the lower and upper cases and the external case for the manufactured device are inevitably used in the display device, it makes a limitation in the slimness of the display device and the development of the new design.

Especially, the upper edges of the liquid crystal display panel are covered with the upper case and external case, whereby the liquid crystal display device is increased in its thickness. Also, the edge width of the liquid crystal display device, that is, bezel width is increased, and step coverage between the light crystal panel and the bezel is increased, which might be an obstruction to the development of innovative design.

SUMMARY

Accordingly, the present invention is directed to a display device that substantially obviates one or more problems due to limitations and disadvantages of the related art.

An advantage of the present invention is to provide a display device which facilitates to minimize a thickness by innovatively removing some parts which have been regarded as indispensible structures for the display device, and simultaneously facilitates to realize a good aesthetic exterior appearance of the display device by a novel design.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device comprising: a liquid crystal display panel for displaying images; a backlight unit for supplying light to the liquid crystal display panel; and a support member for supporting the liquid crystal display panel and the backlight unit; wherein the support member comprises a set cover for receiving the liquid crystal display panel and the backlight unit, the set cover functioning as an external cover; and a guide frame for guiding the position of the liquid crystal display panel and backlight unit, wherein the guide frame and liquid crystal display panel are connected with each other by a connection member provided therebetween.

In another aspect of the present invention, there is provided a display device comprising: a display unit for displaying images; and a support member for supporting the display unit, wherein the support member is not formed on the upper surface of the display unit, wherein the support member comprises a set cover for receiving the display unit, the set cover functioning as an external cover; and a guide frame for guiding the position of the display unit, wherein the guide frame and the display unit are connected with each other by a connection member provided therebetween.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a display device according to the present invention will be described with reference to the accompanying drawings.

Figure 1:
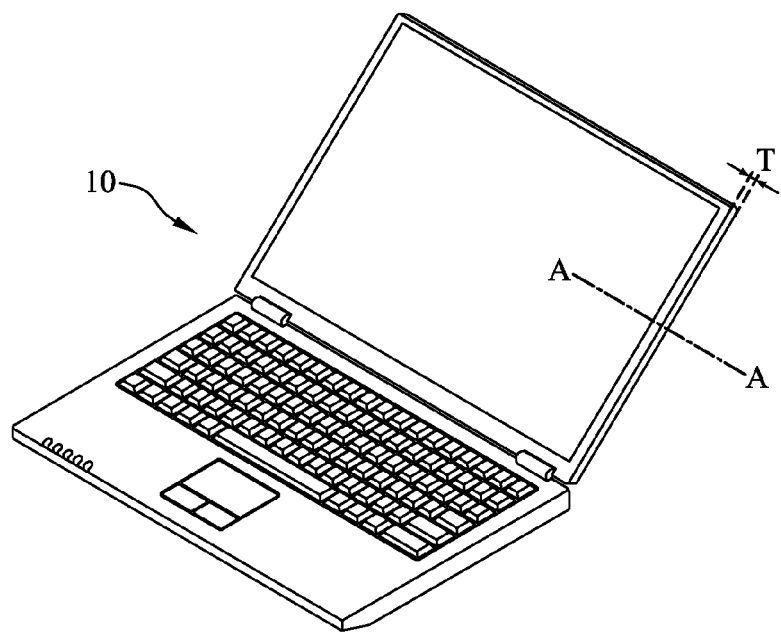
FIG. 1 is a perspective view illustrating a notebook computer to be applied with a display device according to the present invention.

FIG. 1 is a perspective view illustrating a notebook computer 10 to be applied with a display device according to the present invention. FIG. 2, FIGS. 3A to 3D, and FIGS. 4A and 4B are cross section views illustrating respective display devices according to the various embodiments of the present invention, which are cross section views along A-A of FIG. 1.

Figure 2:
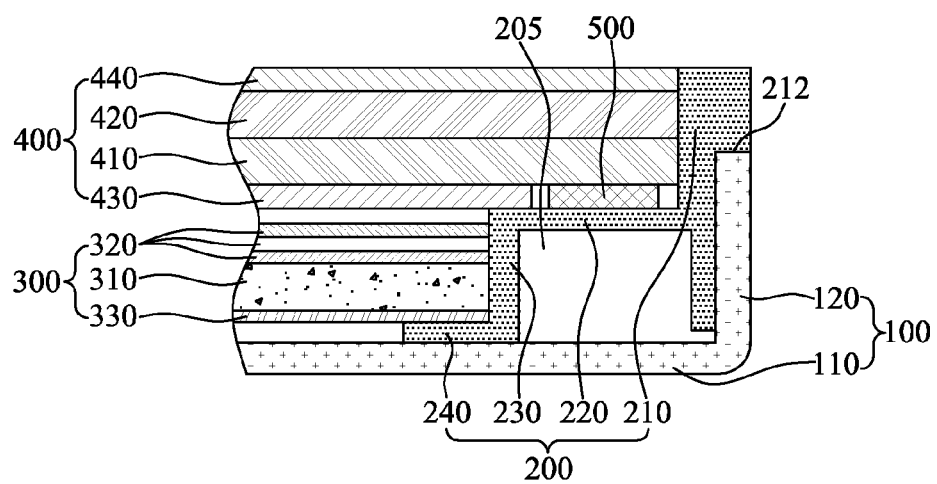
FIG. 2 is a cross section view illustrating a display device according to the first embodiment of the present invention.

FIG. 2 illustrates a cross section view illustrating a display device according to the first embodiment of the present invention. As shown in FIG. 2, the display device according to the first embodiment of the present invention includes support members 100 and 200; display units 300 and 400; and a connection member 500.

The support members 100 and 200 supporting the display units 300 and 400 function as an external cover, wherein the support members 100 and 200 include a set cover 100 and a guide frame 200.

The display units 300 and 400 function to display images thereon, wherein the display units 300 and 400 include a backlight unit 300 and a liquid crystal display panel 400.

The set cover 100 functions as an external cover of a display device such as a notebook computer. Especially, the set cover 100 functions as lower and lateral covers of the display device. For this, the set cover 100 includes a plate 110 and a sidewall 120, wherein the sidewall 120 is extended and curved from one end of the plate 110. The plate 110 functions as the lower cover of the display device; and the sidewall 120 functions as the lateral cover of the display device.

As the plate 110 and sidewall 120 are combined with each other, a predetermined storage space is formed in the set cover 100. Thus, the guide frame 200 and display units 300 and 400 are received in the predetermined storage space. Especially, the set cover 100 is combined with the guide frame 200, whereby the set cover 100, together with the guide frame 200, supports the display units 300 and 400.

The guide frame 200 guides the position of the display units 300 and 400. For this, the guide frame 200 includes a first guide 210, a first supporter 220, a second guide 230, and a second supporter 240.

The first guide 210 and first supporter 220 guide the position of the liquid crystal display panel 400, and also support the liquid crystal display panel 400. The first guide 210 confronts with the lateral side of the liquid crystal display panel 400, and guides the position of the liquid crystal display panel 400. The first supporter 220 is extended from the first guide 210, wherein the first supporter 220 supports the lower surface of the liquid crystal display panel 400, especially, the lower edge of the liquid crystal display panel 400.

Especially, the inner surface of the first guide 210 confronts with the lateral surface of the liquid crystal display panel 400 to thereby guide the position of the liquid crystal display panel 400; and the outer surface of the first guide 210 is in contact with the sidewall 120 of the set cover 100. Also, a groove 212 is formed in the outer surface of the first guide 210. Thus, the sidewall 120 of the set cover 100 is received in the groove 212 of the first guide 210, to thereby decrease an entire width of the display device.

Although not shown, an adhesive such as both-sided tape is provided between the outer surface of the first guide 210 and the sidewall 120 of the set cover 100, whereby the set cover 100 and the guide frame 200 are combined with each other.

The first guide 210, together with the sidewall 120 of the set cover 100, functions as the lateral cover of the display device. Because both the first guide 210 and sidewall 120 of the set cover 100 are not extended to the upper side of the liquid crystal display panel 400, this structure enables to decrease the entire thickness of the display device according to the present invention. Also, this structure enables to decrease a bezel width of the display device, and to remove step coverage between the liquid crystal display panel 400 and the bezel, whereby the front side of the display device is recognized as one structure, to thereby allow the good aesthetic exterior appearance of the display device.

The second guide 230 and second supporter 240 guide the position of the backlight unit 300, and also support the backlight unit 300. The second guide 230 confronts with the lateral side of the backlight unit 300, and guides the position of the backlight unit 300. The second supporter 240 supports the lower surface of the backlight unit 300, especially, the lower edge of the backlight unit 300.

The second guide 230 is extended from the first support 220, and the second supporter 240 is extended from the second guide 230.

Especially, the inner surface of the second supporter 240 supports the lower surface of the backlight unit 300; and the outer surface of the second supporter 240 is in contact with the plate 110 of the set cover 100.

Although not shown, an adhesive such as both-sided tape is provided between the outer surface of the second supporter 240 and the plate 110 of the set cover 100, whereby the set cover 100 and the guide frame 200 are combined with each other by the adhesive.

According to the aforementioned structure of the guide frame 200, there may be a predetermined room for receiving parts for the notebook computer, for example, wires of the notebook computer. That is, the predetermined room 205 may be ensured by the first guide 210, the first supporter 220 extended from the first guide 210, and the second guide 230 extended from the first supporter 220, which constitute the guide frame 200; and the predetermined room 205 may be utilized for receiving parts of the notebook computer, for example, wires of the notebook computer, therein.

The backlight unit 300 is positioned under the liquid crystal display panel 400, wherein the backlight unit 300 emits light to the liquid crystal display panel 400. As mentioned above, the position of the backlight unit 300 is guided by the second guide 230 of the guide frame 200, and the backlight unit 300 is supported by the second supporter 240 of the guide frame 200.

The backlight unit 300 may be largely classified into a direct type and an edge type. In case of the direct type backlight unit, a light source is arranged on an entire lower surface of the liquid crystal display panel 400 so that light emitted from the light source is directly transmitted to the liquid crystal display panel 400. Meanwhile, in case of the edge type backlight unit, a light source is arranged at a lower side of the liquid crystal display panel 400 so that light emitted from the light source is transmitted to the liquid crystal display panel 400 through a light guiding plate. The display device according to the present invention may be applied to the direct type or edge type.

In order to minimize the thickness of the display device, the edge type backlight unit is preferable. In this respect, the accompanying drawings show the edge type backlight unit 300.

The backlight unit 300 includes a light guiding plate 310, plural optical sheets 320, and a reflective plate 330.

Although not shown, the light source such as light-emitting diode or fluorescent lamp is arranged while confronting with the lateral side of the light guiding plate 310. After the light emitted from the light source is incident on the light guiding plate 310, a path of the incident light is changed toward the liquid crystal display panel 400. For changing the light path, various patterns may be formed in the light guiding plate 310.

The plural optical sheets 320 are formed on an upper surface of the light guiding plate 310, wherein the plural optical sheets 320 are provided to uniformly supply the light toward the liquid crystal display panel 400. The plural optical sheets 320 may include light diffusion sheet and prism sheet.

The reflective plate 330 is formed on a lower surface of the light guiding plate 310, wherein the reflective plate 330 improves light efficiency by upwardly reflecting the light leaking in the lower surface of the light guiding plate 310.

The liquid crystal display panel 400, which is positioned above the backlight unit 300, displays images thereon. As mentioned above, the position of the liquid crystal display panel 400 is guided by the first guide 210 of the guide frame 200; and the liquid crystal display panel 400 is supported by the first supporter 220 of the guide frame 200.

The liquid crystal display panel 400 includes a lower substrate 410, an upper substrate 420, a lower polarizing plate 430, and an upper polarizing plate 440.

A liquid crystal layer is formed between the lower substrate 410 and the upper substrate 420. A detailed structure of the lower substrate 410 and upper substrate 420 may vary according to a driving mode of the liquid crystal display panel 400, for example, Twisted Nematic (TN) mode, Vertical Alignment (VA) mode, In-Plane Switching (IPS) mode, Fringe Field Switching (FFS) mode, and etc., which are generally known to those skilled in the art.

The lower polarizing plate 430 is adhered to a lower surface of the lower substrate 410; and the upper polarizing plate 440 is adhered to an upper surface of the upper substrate 420.

The connection member 500 is provided to connect the support members 100 and 200 with the display units 300 and 400. In more detail, the connection member 500 is formed between the liquid crystal display panel 400 and the guide frame 200 so as to connect the liquid crystal display panel 400 with the guide frame 200, to thereby prevent the liquid crystal display panel 400 from being upwardly separated.

As mentioned above, according to the aforementioned embodiment of the present invention, the support members 100 and 200 such as the set cover 100 and the guide frame 200 are not formed on the upper surface of the liquid crystal display panel 400, and more particularly, the upper edge of the liquid crystal display panel 400 so that it is possible to obtain the display device with the decreased thickness and the novel design of good aesthetic exterior appearance. However, because the support members 100 and 200 are not formed on the upper surface of the liquid crystal display panel 400, the liquid crystal display panel 400 may be separated upwardly.

The connection member 500 is provided to prevent the separation of the liquid crystal display panel 400. The connection member 500 is formed between the liquid crystal display panel 400 and the first supporter 220 of the guide frame 200, to thereby connect the liquid crystal display panel 400 with the guide frame 200. The connection member 500 may be formed of the adhesive such as both-sided tape.

Meanwhile, the lower polarizing plate 430 of the liquid crystal display panel 400 is not formed in a portion with the connection member 500. That is, the connection member 500 is formed between the lower substrate 410 of the liquid crystal display panel 400 and the first supporter 220 of the guide frame 200, to thereby prevent the display device from being increased in its thickness, which might cause by the additional connection member 500.

The aforementioned explanation relates to the liquid crystal display device corresponding to one of the various display devices, but not necessarily. Instead of the liquid crystal display device, various display devices such as organic light-emitting device may be applied. In this case, the aforementioned guide frame 200 may be appropriately changed in its structure.

FIGS. 3A to 3D are cross section views illustrating display devices according to the second to fifth embodiments of the present invention. Except that sealing members 710, 720, and 730 are additionally formed, between the support members 100 and 200 and the display units 300 and 400, especially, between a guide frame 200 and a liquid crystal display panel 400, the display devices according to the second to fifth embodiments of the present invention are identical in structure to the aforementioned display device according to the first embodiment of the present invention. Thus, the same reference numbers will be used throughout the drawings to refer to the same or like parts, and a detailed explanation for the same parts will be omitted.

In consideration to a general manufacturing error, a gap may occur between the liquid crystal display panel 400 and a first guide 210 of the guide frame 200. In this case, foreign matters may come into the inside of the display device through the gap, and the gap may result in the deteriorated design of the display device.

The second to fifth embodiments of the present invention comprise further the sealing members 710, 720, and 730 formed between the first guide 200 of the guide frame 200 and the liquid crystal display panel 400, thereby blocking the gap and preventing the deteriorated design of the display device.

For preventing the design deterioration of the display device, the sealing members 710, 720, and 730 are formed of the same color as the guide frame 200, preferably.

Hereinafter, the sealing members 710, 720, and 730 according to the second to fifth embodiments of the present invention will be described in detail as follows.

Figure 3A:
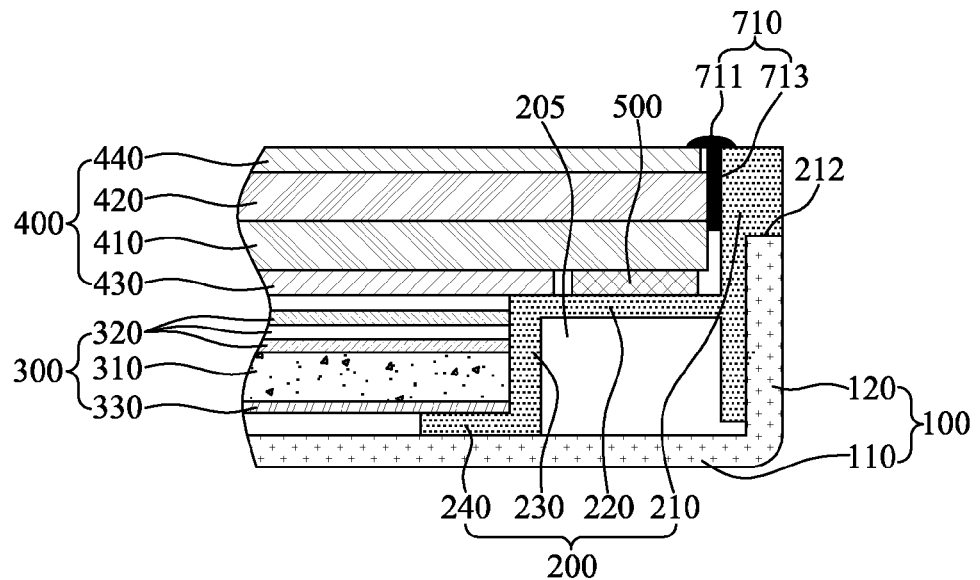
FIGS. 3A to 3D are cross section views illustrating respective display devices according to the second to fifth embodiments of the present invention.

As shown in FIG. 3A, according to the second embodiment of the present invention, the sealing member 710 comprises a head 711 and a head supporter 713. The head 711 is formed on from a predetermined portion of the upper surface of the liquid crystal display panel 400 to a predetermined portion of the upper surface of the first guide 210 of the guide frame 200; and the head supporter 713 is extended from the head 711. Especially, the head supporter 713 is inserted into the gap between the liquid crystal display panel 400 and the first guide 210 of the guide frame 200.

The structure of FIG. 3A may be obtained by the process of inserting the sealing member 710 into the gap between the liquid crystal display panel 400 and the first guide 210 of the guide frame 200 under the circumstance that the liquid crystal display panel 400 is placed onto the guide frame 200.

Since the head 711 is formed on from the predetermined portion of the upper surface of the liquid crystal display panel 400 to the predetermined portion of the upper surface of the first guide 210 of the guide frame 200, sealing efficiency is obtained between the liquid crystal display panel 400 and the guide frame 200. Also, the connection between the liquid crystal display panel 400 and the guide frame 200 becomes strong by the head 711 and head supporter 713, to thereby prevent the separation of the liquid crystal display panel 400.

If needed, the liquid crystal display panel 400 may be connected with the guide frame 200, through the use of only sealing member 710 without using the connection member 500.

Figure 3B:
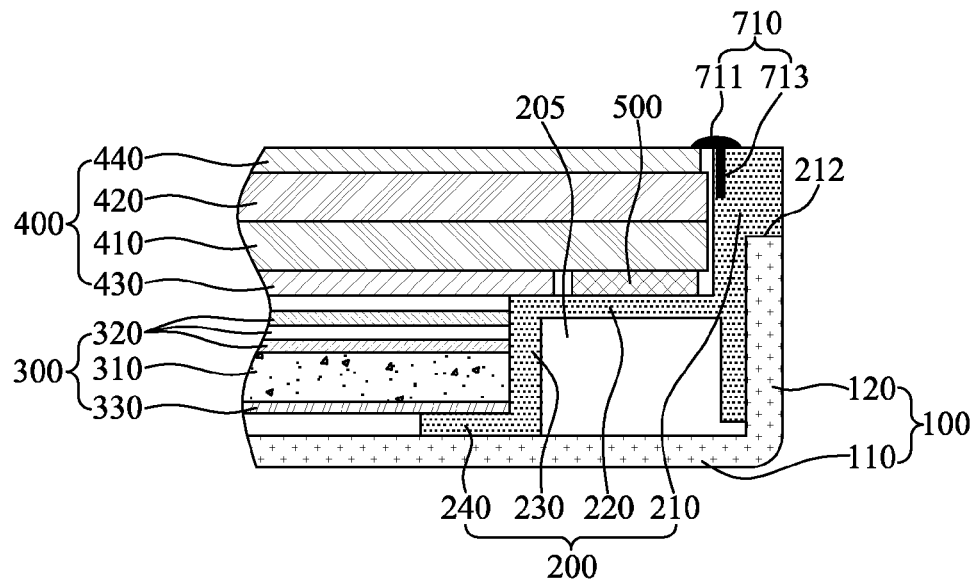

As shown in FIG. 3B, according to the third embodiment of the present invention, the sealing member 710 comprises a head 711 and a head supporter 713. The head 711 is formed on from a predetermined portion of the upper surface of the liquid crystal display panel 400 to a predetermined portion of the upper surface of the first guide 210 of the guide frame 200; and the head supporter 713 is extended from the head 711. Especially, the head supporter 713 is inserted into the first guide 210 of the guide frame 200.

The structure of FIG. 3B may be obtained by the process of manufacturing the guide frame 200 with the sealing member 710 inserted thereinto by a double injection molding method, and placing the liquid crystal display panel 400 onto the guide frame 200.

The display device shown in FIG. 3B can be manufactured without the process of inserting the sealing member 710. Thus, the display device shown in FIG. 3B may be manufactured with the simplified process in comparison to the display device shown in FIG. 3A.

Figure 3C:
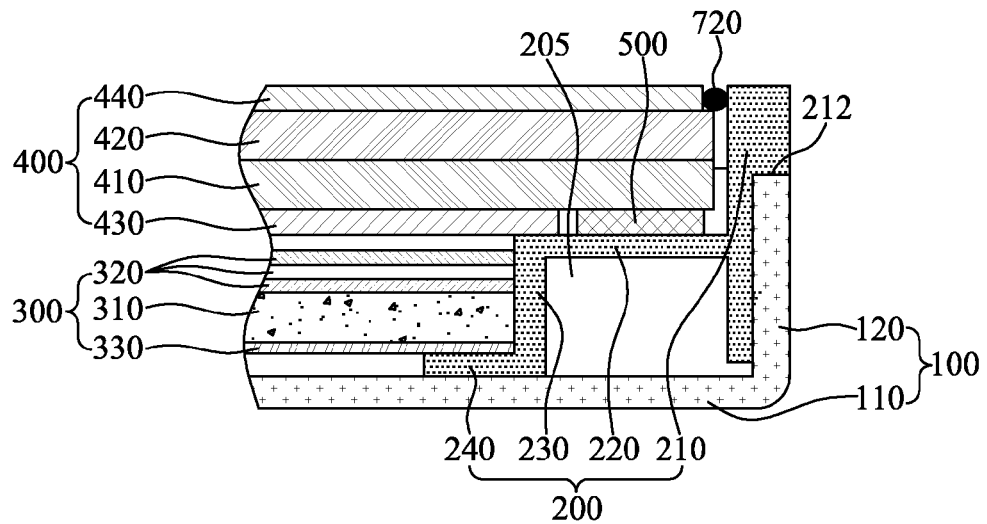

As shown in FIG. 3C, according to the fourth embodiment of the present invention, the sealing member 720 is formed of a ring-shaped structure which is inserted into the gap between the first guide 210 of the guide frame 200 and the liquid crystal display panel 400.

A cross section of the ring-shaped structure is not limited to a circle. The cross section of the sealing member 720 may be formed in any shape capable of being inserted into the gap between the liquid crystal display panel 400 and the first guide 210 of the guide frame 200.

Figure 3D:
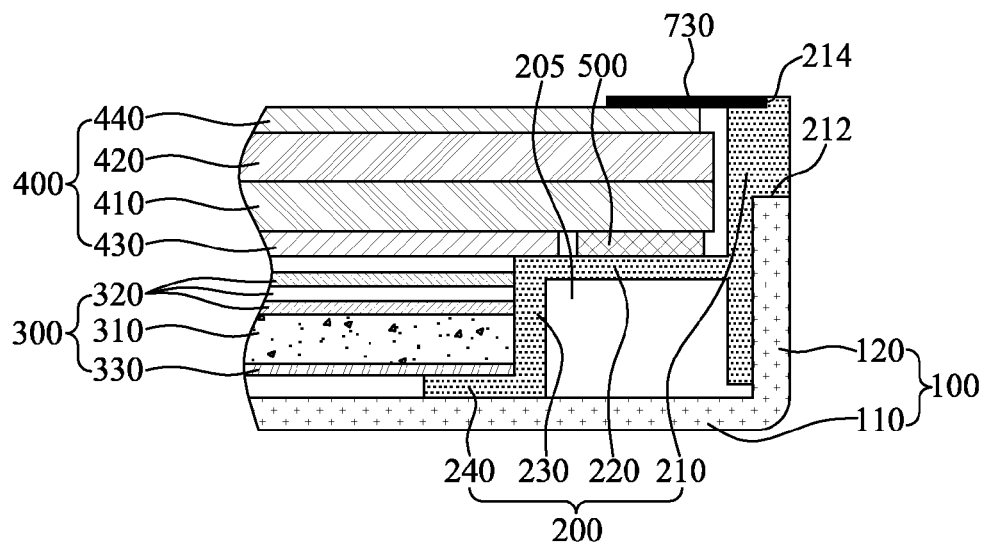

As shown in FIG. 3D, according to the fifth embodiment of the present invention, the sealing member 730 may be formed of a film-type structure, wherein the film-type structure is formed on from a predetermined portion of the upper surface of the liquid crystal display panel 400 to a predetermined portion of the upper surface of the first guide 210 of the guide frame 200.

Owing to the film-type structure, sealing efficiency is obtained between the liquid crystal display panel 400 and the guide frame 200. Also, the improved connection between the liquid crystal display panel 400 and the guide frame 200 enables to prevent the separation of the liquid crystal display panel 400.

If the film-type structure is extended to the edge of the first guide 210 of the guide frame 200, the film-type structure may be easily peeled off. Preferably, the film-type structure is not extended to the edge of the first guide 210 of the guide frame 200. Especially, as shown in the accompanying drawings, if a groove 214 for receiving the film-type structure is formed in the upper surface of the first guide 210, it can minimize probability of peeling off the film-type structure.

Figure 4A:
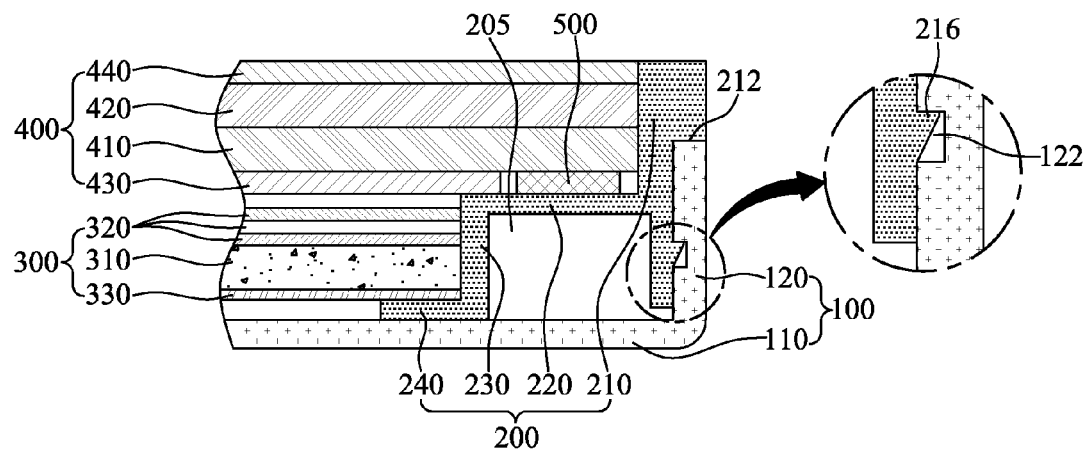
FIGS. 4A and 4B are cross section views illustrating respective display devices according to the sixth and seventh embodiments of the present invention.
Figure 4B:
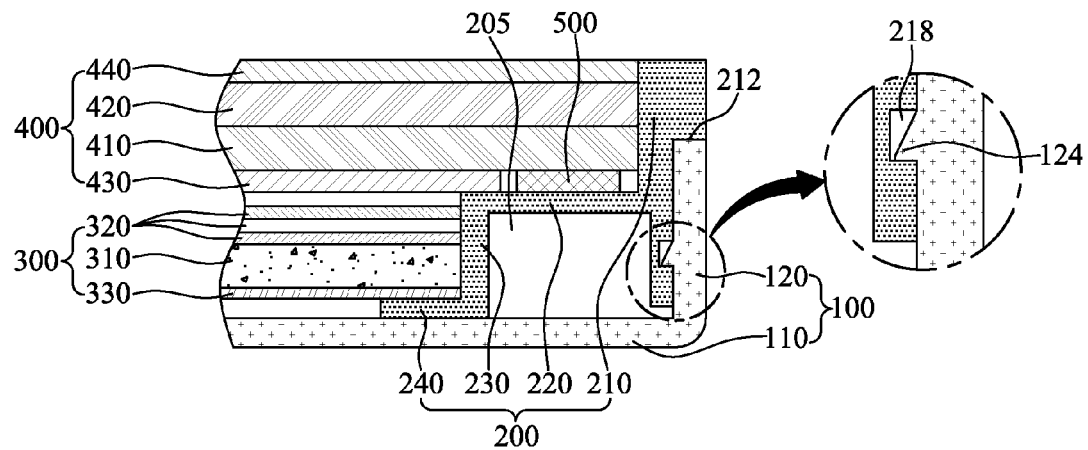

FIGS. 4A and 4B are cross section views illustrating display devices according to the sixth and seventh embodiments of the present invention. Except a connection method between the set cover 100 and the guide frame 200, the display devices according to the sixth and seventh embodiments of the present invention are identical in structure to the display device according to the first embodiment of the present invention. Accordingly, the same reference numbers will be used throughout the drawings to refer to the same or like parts, and a detailed explanation for the same parts will be omitted.

Like the aforementioned embodiments of the present invention, the set cover 100 and the guide frame 200 may be connected with each other through the use of adhesive such as both-sided tape. In this case, the manufacturing process may be complicated, and manufacturing cost may be increased.

In the sixth and seventh embodiments of the present invention, a protrusion is formed in any one of the set cover 100 and the guide frame 200, and a coupling groove to be coupled with the protrusion is formed in the other. Thus, there is no need to use the additional adhesive such as both-sided tape for the connection between the set cover 100 and the guide frame 200.

These sixth and seventh embodiments of the present invention will be explained in detail as follows.

As shown in FIG. 4A, according to the sixth embodiment of the present invention, a protrusion 216 is formed in the outer surface of the first guide 210 of the guide frame 200; and a coupling groove 122 to be coupled with the protrusion 216 is formed at the sidewall 120 of the set cover 100, whereby the set cover 100 and the guide frame 200 are stably connected with each other by the coupling of the protrusion 216 and the coupling groove 122.

As shown in FIG. 4A, the protrusion 216 is formed in a triangular-shaped structure and the coupling groove 122 is formed in a quadrangle-shaped structure, but not limited to this. The protrusion 216 and the coupling groove 122 may vary in shape.

As shown in FIG. 4B, according to the seventh embodiment of the present invention, a coupling groove 218 is formed in the outer surface of the first guide 210 of the guide frame 200; and a protrusion 124 to be coupled with the coupling groove 218 is formed at the sidewall 120 of the set cover 100, whereby the set cover 100 and the guide frame 200 are stably connected with each other by the coupling of the coupling groove 218 and the protrusion 124.

In case of FIG. 4B, the coupling groove 218 provided in the first guide 210 of the guide frame 200 may be formed in a hole type passing through the first guide 210.

In case of FIG. 4A, the sidewall 120 of the set cover 100 functions as the lateral cover of the manufactured product. In this case, preferably, the coupling groove 122 provided at the sidewall 120 of the set cover 100 is not formed in the hole type passing through the sidewall 120 by reason of aesthetic exterior appearance.

Although not shown, the display devices according to the sixth and seventh embodiments of the present invention may be provided with any one of the sealing members 710, 720, and 730 shown in FIGS. 3A to 3D, and may be formed by the connection method between the set cover 100 and the guide frame 200 through the use of protrusion and coupling groove shown in FIG. 4A or 4B.

Figure 5:
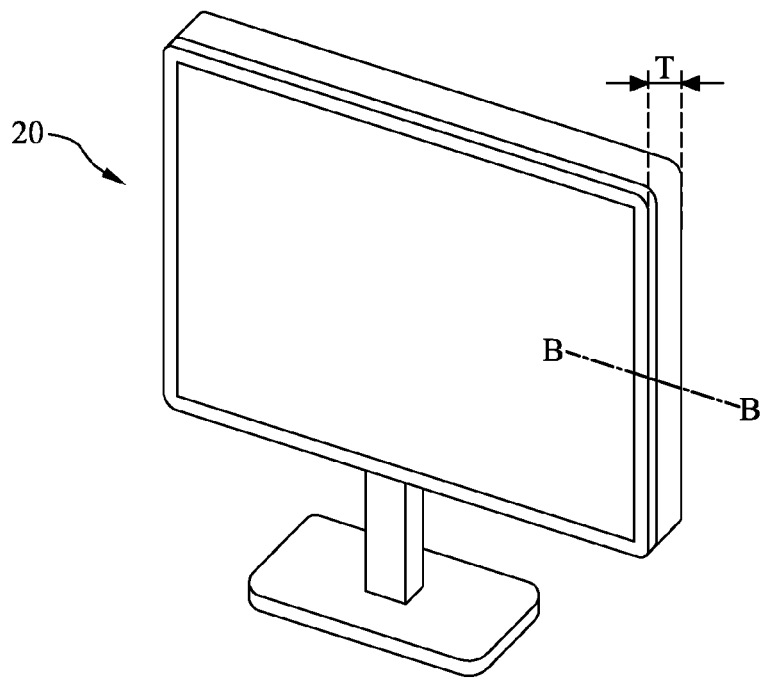
FIG. 5 is a perspective view illustrating a monitor to be applied with a display device according to the present invention.

FIG. 5 is a perspective view illustrating a monitor 20 to be applied with a display device according to the present invention. FIG. 6, FIGS. 7A to 7D, FIGS. 8A and 8B, and FIGS. 9A and 9B cross section views illustrating display devices according to the various embodiments of the present invention, which are cross section views along B-B of FIG. 5.

Figure 6:
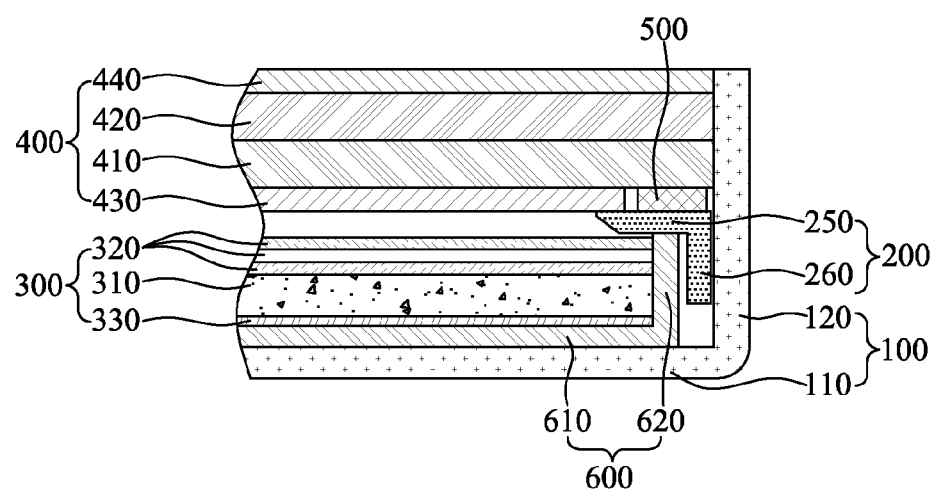
FIG. 6 is a cross section view illustrating a display device according to the eighth embodiment of the present invention.

FIG. 6 is a cross section view illustrating the display device according to the eighth embodiment of the present invention. As shown in FIG. 6, the display device according to the eighth embodiment of the present invention includes support members 100, 200, and 600; display units 300 and 400; and a connection member 500.

The support members 100, 200, and 600 support the display units 300 and 400. In more detail, the support members 100, 200, and 600 comprise a set cover 100, a guide frame 200, and a support cover 600. The display units 300 and 400 display images thereon, wherein the display units 300 and 400 comprise a backlight unit 300 and a liquid crystal display panel 400.

Like the aforementioned first embodiment of the present invention, the set cover 100 includes a plate 110 and a sidewall 120, wherein the sidewall 120 is extended and curved from one end of the plate 110. The plate 110 functions as a lower cover of the display device; and the sidewall 120 functions as a lateral cover of the display device.

The sidewall 120 of the set cover 100 is not extended to an upper side of the liquid crystal display panel 400. This structure enables to decrease the entire thickness of the display device according to the present invention. Also, this structure enables to decrease a bezel width of the display device, and to remove step coverage between the liquid crystal display panel 400 and the bezel, whereby the front of the display device is recognized as one structure, to thereby allow the good aesthetic exterior appearance of the display device.

The guide frame 200 and support cover 600 guide the position of the display units 300 and 400, and also support the display units 300 and 400.

The guide frame 200 includes a third supporter 250 and a third guide 260. The third supporter 250 of the guide frame 200 supports the lower surface of the liquid crystal display panel 400, especially, the lower edge of the liquid crystal display panel 400. The third guide 260 of the guide frame 200, which is extended from the third supporter 250, guides the support cover 600.

The support cover 600 includes a fourth supporter 610 and a fourth guide 620. The fourth supporter 610 of the support cover 600 supports the lower surface of the backlight unit 300. The fourth guide 620 of the support cover 600 is extended from the fourth supporter 610. While being provided to confront with the lateral side of the backlight unit 300, the fourth guide 620 guides the position of the backlight unit 300.

The support cover 600 sends out heat generated from the backlight unit 300 through a uniform transmission of the heat. That is, if the display device is increased in size, the heat generated from the backlight unit 300 may be increased so that it necessarily requires a radiation apparatus for sending out the heat generated from the backlight unit 300. Thus, if the support cover 600 is formed of a metal material with high thermal conductivity, the heat generated from the backlight unit 300 is transmitted through the support cover 600, and is then sent out to the external.

In the aforementioned first to seventh embodiments of the present invention, the support cover 600 is not provided, and the backlight unit 300 may be covered with the plastic guide frame 200 with low thermal conductivity. Thus, while the display devices according to the first to seventh embodiments of the present invention are suitable for the relatively small-sized device such as the notebook computer, that is, the device radiating the relatively small amount of heat; the display device according to the eighth embodiment of the present invention is suitable for the relatively large-sized device such as the monitor or television, that is, the device radiating the relatively large amount of heat.

The guide frame 200 may be connected with the set cover 100 and/or support cover 600. For example, the guide frame 200 and set cover 100 may be connected by an adhesive such as both-sided tape provided between the outer surface of the third guide 260 of the guide frame 200 and the sidewall 120 of the set cover 100. Also, the guide frame 200 and support cover 600 may be connected by an adhesive such as both-sided tape provided between the inner surface of the third guide 260 of the guide frame 200 and the fourth guide 620 of the support cover 600.

The set cover 100 and support cover 600 may be connected with each other by the adhesive such as both-sided tape provided therebetween. However, if the display device of the present invention is applied to not the notebook but the monitor or television, the second cover 100 and support cover 600 may be connected with each other by bolt-nut coupling. This is because the bolt-nut coupling portion for the connection between the set cover 100 and the support cover 600 is positioned at the rear side of the monitor or television, that is, it is unperceived.

The backlight unit 300, which is positioned under the liquid crystal display panel 400, supplies light to the liquid crystal display panel 400. At this time, the position of the backlight unit 300 is guided by the fourth guide 620 of the support cover 600, and the backlight unit 300 is supported by the fourth supporter 610 of the support cover 600.

A detailed structure of the backlight unit 300 is the same as the aforementioned backlight unit according to the first embodiment of the present invention. That is, the backlight unit 300 may be formed in an edge type comprising a light guiding plate 310, plural optical sheets 320, and a reflective plate 330, of which detailed explanation will be omitted.

The liquid crystal display panel 400 displays images, wherein the liquid crystal display panel 400 is positioned above the backlight unit 300. The liquid crystal display panel 400 is supported by the third supporter 250 of the guide frame 200.

A detailed structure of the liquid crystal display panel 400 is the same as the aforementioned liquid crystal display panel according to the first embodiment of the present invention. That is, the liquid crystal panel 400 comprises a lower substrate 410, an upper substrate 420, a lower polarizing plate 430, and an upper polarizing plate 400, of which detailed explanation will be omitted.

Like the aforementioned first embodiment of the present invention, the connection member 500 is formed between the support members 100, 200, and 600 and the display units 300 and 400, and more particularly, between the liquid crystal display panel 400 and the guide frame 200, whereby the liquid crystal display panel 400 is connected with the guide frame 200, to thereby prevent the liquid crystal display panel 400 from being upwardly separated.

The lower polarizing plate 430 of the liquid crystal display panel 400 is not formed in a portion with the connection member 500. That is, the connection member 500 is formed between the lower substrate 410 of the liquid crystal display panel 400 and the third supporter 250 of the guide frame 200, to thereby prevent the display device from being increased in its thickness, which might cause by the additional connection member 500. This is similar to the aforementioned first embodiment of the present invention.

FIGS. 7A to 7D are cross section views illustrating respective display devices according to the ninth to twelfth embodiments of the present invention. Except that sealing members 710, 720, and 730 are additionally formed between the set cover 100 and the liquid crystal display panel 400, the display devices according to the ninth to twelfth embodiments of the present invention are identical in structure to the aforementioned display device according to the eighth embodiment of the present invention. Thus, the same reference numbers will be used throughout the drawings to refer to the same or like parts, and a detailed explanation for the same parts will be omitted.

The sealing members 710, 720, and 730 are additionally formed between the liquid crystal display panel 400 and the sidewall 120 of the set cover 100 in the respective display devices according to the ninth to twelfth embodiments of the present invention. Thus, it is possible to prevent foreign matters from coming into the inside of the display device via a gap, which might occur between the liquid crystal display panel 400 and the set cover 100 by a manufacturing error, and also to prevent the design of display device from being deteriorated. The sealing members 710, 720, and 730 are formed of the same color as the set cover 100, preferably.

Hereinafter, the sealing members 710, 720, and 730 according to the ninth to twelfth embodiments of the present invention will be described in detail as follows.

Figure 7A:
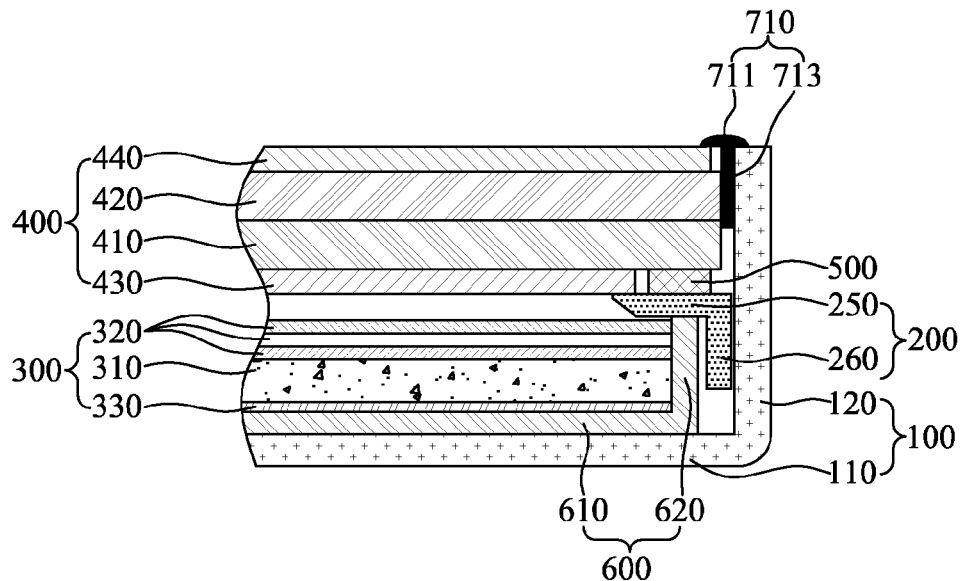
FIGS. 7A to 7D are cross section views illustrating respective display devices according to the ninth to twelfth embodiments of the present invention.

As shown in FIG. 7A, according to the ninth embodiment of the present invention, the sealing member 710 comprises a head 711 and a head supporter 713. The head 711 is formed on from a predetermined portion of the upper surface of the liquid crystal display panel 400 to a predetermined portion of the sidewall 120 of the set cover 100. Especially, the head supporter 713 is inserted into the gap between the liquid crystal display panel 400 and the sidewall 120 of the set cover 100.

The structure of FIG. 7A may be obtained by the process of inserting the sealing member 710 into the gap between the liquid crystal display panel 400 and the sidewall 120 of the set cover 100 under the circumstance that the liquid crystal display panel 400 is placed onto the guide frame 200.

Since the head 711 is formed on from the predetermined portion of the upper surface of the liquid crystal display panel 400 to the predetermined portion of the upper surface of the set cover 100, sealing efficiency is obtained between the liquid crystal display panel 400 and the sidewall 120 of the set cover 100. Also, the connection between the liquid crystal display panel 400 and the set cover 100 becomes strong by the head 711 and head supporter 713, to thereby prevent the separation of the liquid crystal display panel 400.

If needed, the liquid crystal display panel 400 may be connected with the set cover 200, through the use of only sealing member 710 without using the connection member 500.

Figure 7B:
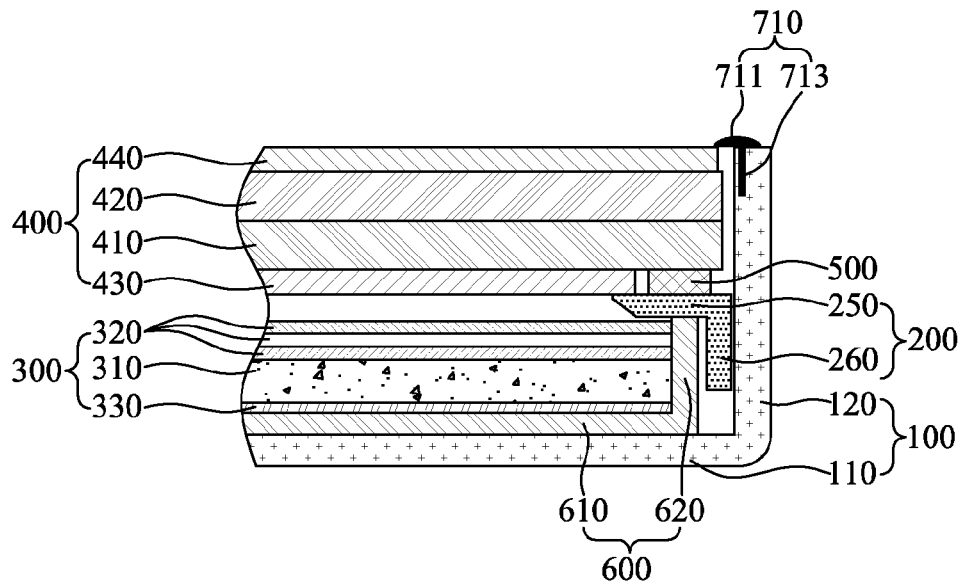

As shown in FIG. 7B, according to the tenth embodiment of the present invention, the sealing member 710 comprises a head 711 and a head supporter 713. The head 711 is formed on from a predetermined portion of the upper surface of the liquid crystal display panel 400 to a predetermined portion of the upper surface of the sidewall 120 of the set cover 100; and the head supporter 713 is extended from the head 711. In this case, the head supporter 713 is inserted into the sidewall 120 of the set cover 100.

The structure of FIG. 7B may be obtained by the process of manufacturing the set cover 100 with the sealing member 710 inserted thereinto by a double injection molding method, and placing the liquid crystal display panel 400 onto the set cover 100.

Figure 7C:
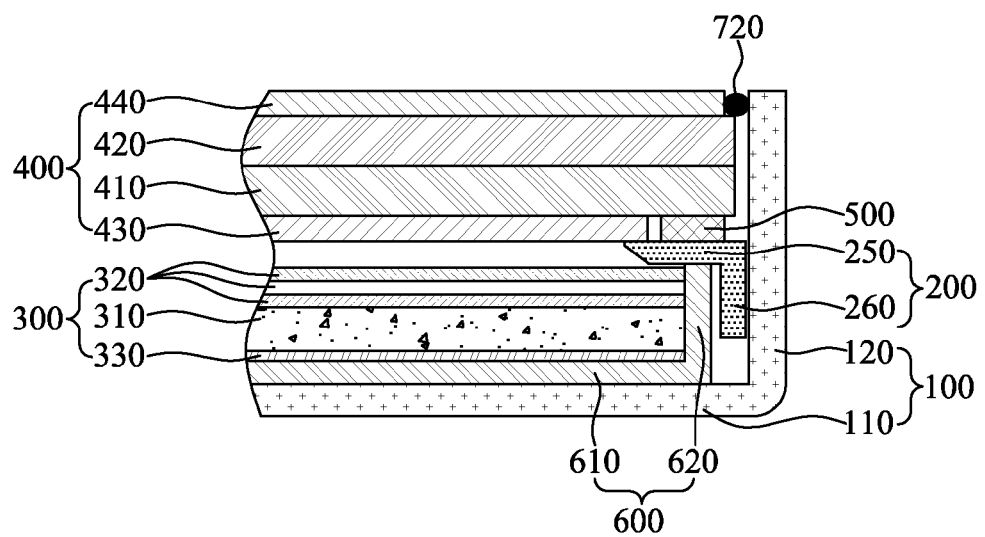

As shown in FIG. 7C, according to the eleventh embodiment of the present invention, the sealing member 720 is formed of a ring-shaped structure which is inserted into the gap between the liquid crystal display panel 400 and the sidewall 120 of the set cover 100. A cross section of the ring-shaped structure is not limited to a circle. The cross section of the sealing member 720 may be formed in any shape capable of being inserted into the gap between the liquid crystal display panel 400 and the sidewall 120 of the set cover 100.

Figure 7D:
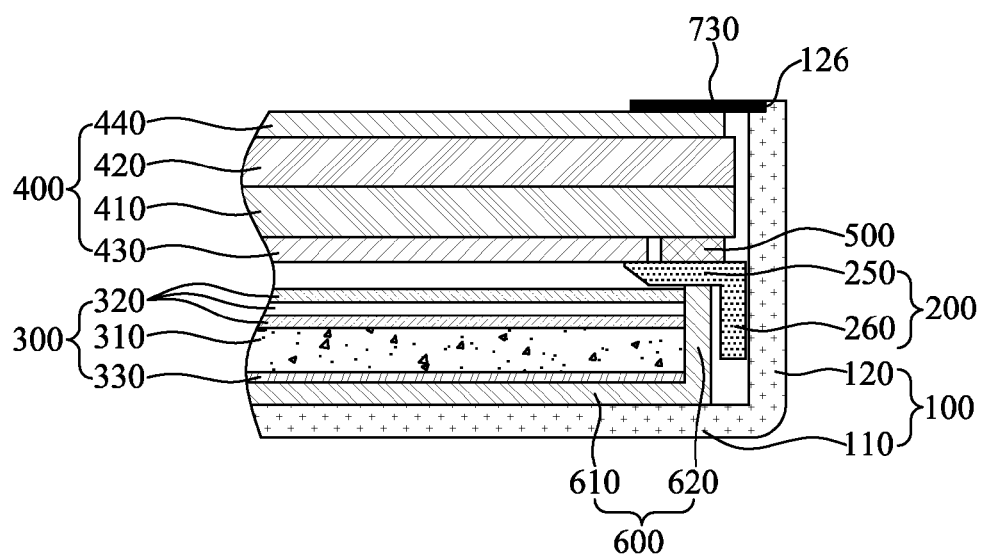

As shown in FIG. 7D, according to the twelfth embodiment of the present invention, the sealing member 730 may be formed of a film-type structure, wherein the film-type structure is formed on from a predetermined portion of the upper surface of the liquid crystal display panel 400 to a predetermined portion of the upper surface of the sidewall 120 of the set cover 100.

Preferably, the film-type structure is not extended to the edge of the sidewall 120 of the set cover 100. Especially, as shown in the accompanying drawings, if a groove 126 for receiving the film-type structure is formed in the upper surface of the sidewall 120, it can minimize probability of peeling off the film-type structure.

Figure 8A:
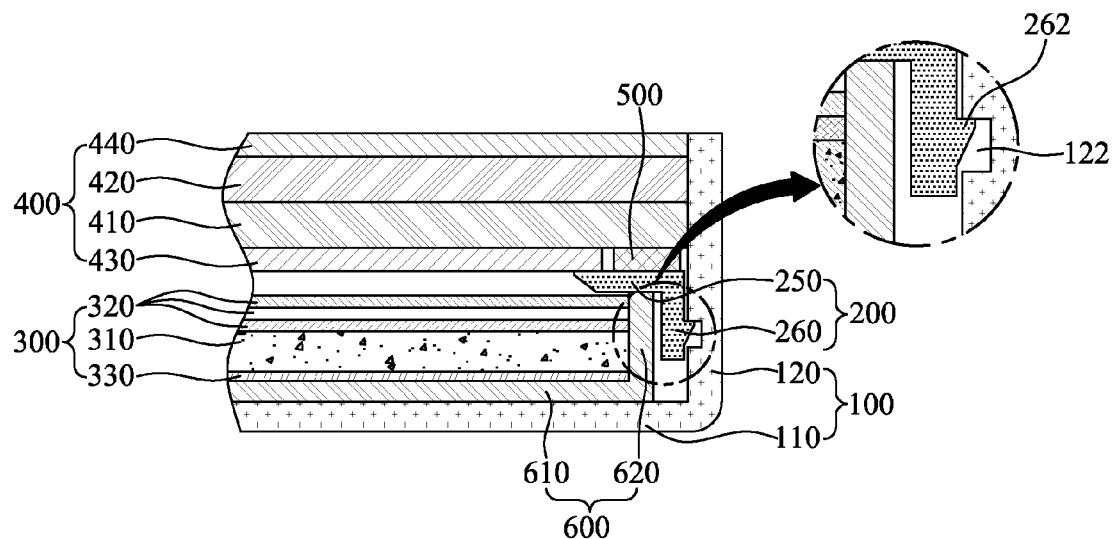
FIGS. 8A and 8B are cross section views illustrating respective display devices according to the thirteenth and fourteenth embodiments of the present invention.
Figure 8B:
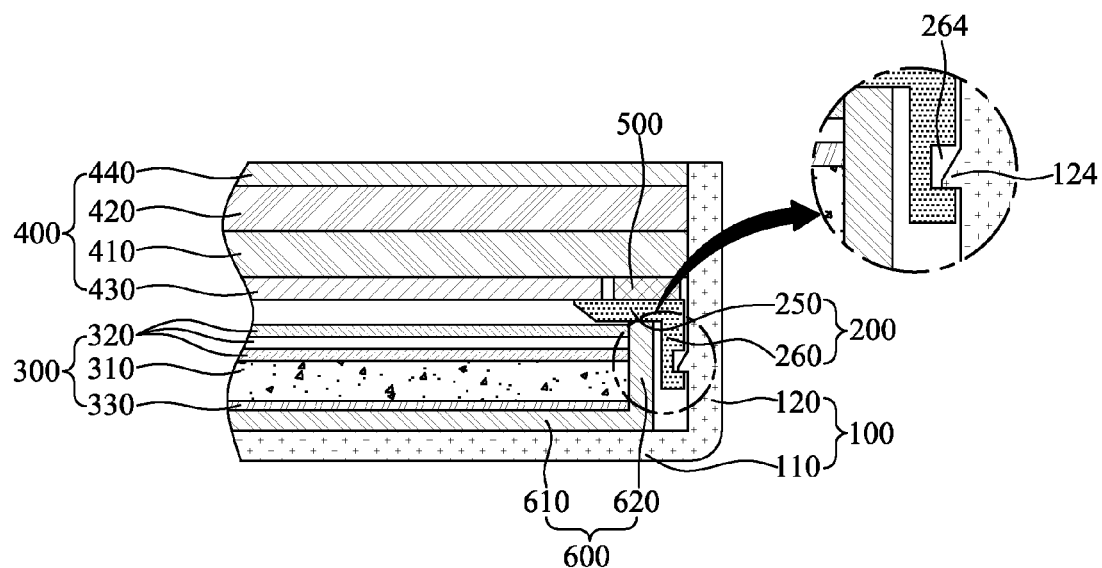

FIGS. 8A and 8B are cross section views illustrating respective display devices according to the thirteenth and fourteenth embodiments of the present invention. Except a connection method between the set cover 100 and the guide frame 200, the display devices according to the thirteenth and fourteenth embodiments of the present invention are identical in structure to the display device according to the eighth embodiment of the present invention shown in FIG. 6. Accordingly, the same reference numbers will be used throughout the drawings to refer to the same or like parts, and a detailed explanation for the same parts will be omitted.

As shown in FIG. 8A, according to the thirteenth embodiment of the present invention, a protrusion 262 is formed in the outer surface of the third guide 260 of the guide frame 200; and a coupling groove 122 to be coupled with the protrusion 262 is formed at the sidewall 120 of the set cover 100, whereby the set cover 100 and the guide frame 200 are stably connected with each other by the coupling of the protrusion 262 and the coupling groove 122.

As shown in FIG. 8B, according to the fourteenth embodiment of the present invention, a coupling groove 264 is formed in the outer surface of the third guide 260 of the guide frame 200; and a protrusion 124 to be coupled with the coupling groove 264 is formed at the sidewall 120 of the set cover 100, whereby the set cover 100 and the guide frame 200 are stably connected with each other by the coupling of the coupling groove 264 and the protrusion 124.

In case of FIG. 8B, the coupling groove 264 provided in the third guide 260 of the guide frame 200 may be formed in a hole type passing through the third guide 260.

Although not shown, the display devices according to the thirteenth and fourteenth embodiments of the present invention may be provided with any one of the sealing members 710, 720, and 730 shown in FIGS. 7A to 7D, and may be formed by the connection method between the set cover 100 and the guide frame 200 through the use of protrusion and coupling groove shown in FIG. 8A or 8B.

Figure 9A:
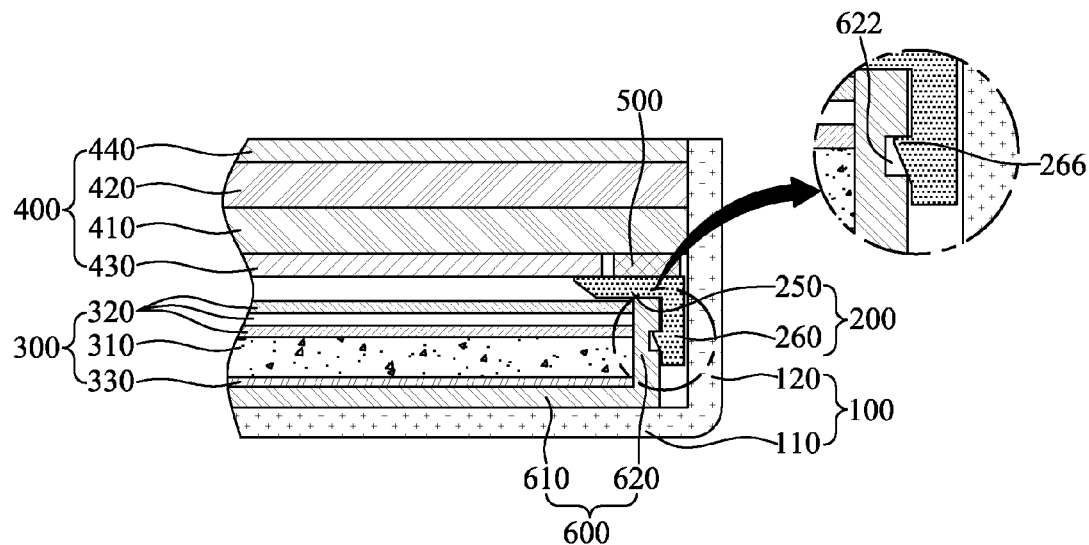
FIGS. 9A and 9B are cross section views illustrating respective display devices according to the fifteenth and sixteenth embodiments of the present invention.
Figure 9B:
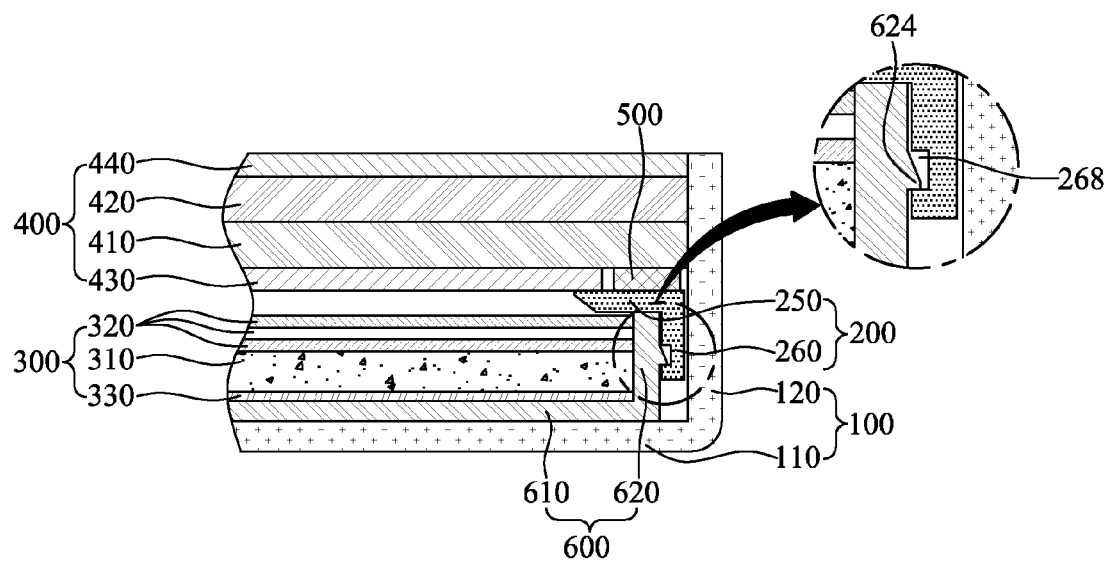

FIGS. 9A and 9B are cross section views illustrating respective display devices according to the fifteenth and sixteenth embodiments of the present invention. Except a connection method between the support cover 600 and the guide frame 200, the display devices according to the fifteenth and sixteenth embodiments of the present invention are identical in structure to the display device according to the eighth embodiment of the present invention. Accordingly, the same reference numbers will be used throughout the drawings to refer to the same or like parts, and a detailed explanation for the same parts will be omitted.

As shown in FIG. 9A, according to the fifteenth embodiment of the present invention, a protrusion 266 is formed in the inner surface of the third guide 260 of the guide frame 200; and a coupling groove 622 to be coupled with the protrusion 266 is formed at the third guide 620 of the support cover 600, whereby the support cover 600 and the guide frame 200 are connected with each other by the coupling of the protrusion 266 and the coupling groove 622.

As shown in FIG. 9B, according to the sixteenth embodiment of the present invention, a coupling groove 268 is formed in the inner surface of the third guide 260 of the guide frame 200; and a protrusion 624 to be coupled with the coupling groove 268 is formed at the third guide 620 of the support cover 600, whereby the support cover 100 and the guide frame 200 are connected with each other by the coupling of the coupling groove 268 and the protrusion 624.

Although not shown, the display devices according to the fifteenth and sixteenth embodiments of the present invention may be provided with any one of the sealing members 710, 720, and 730 shown in FIGS. 7A to 7D, and may be formed by the connection method between the support cover 600 and the guide frame 200 through the use of protrusion and coupling groove shown in FIG. 9A or 9B.

Also, although not shown, the display devices according to the fifteenth and sixteenth embodiments of the present invention may be formed by the connection method between the set cover 100 and the guide frame 200 through the use of protrusion and coupling groove shown in FIG. 8A or 8B, and may be formed by the connection method between the support cover 600 and the guide frame 200 through the use of protrusion and coupling groove shown in FIG. 9A or 9B.

In the display device according to the present invention, the lower and lateral sides of the display device are covered without using upper and external cases to cover the upper edge of display device. Thus, the entire thickness of the display device is decreased; the bezel width of the display device is also decreased; and the entire step coverage of the display device is removed, whereby the front of the display device is recognized as one structure, to thereby allow the good aesthetic exterior appearance of the display device.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
a liquid crystal display panel for displaying images;
a backlight unit for supplying light to the liquid crystal display panel; and
a support member for supporting the liquid crystal display panel and the backlight unit;
wherein the support member comprises a set cover for receiving the liquid crystal display panel and the backlight unit, the set cover functioning as an external cover; and a guide frame for guiding the position of the liquid crystal display panel and backlight unit,
wherein the guide frame and liquid crystal display panel are connected with each other by a connection member provided therebetween,
wherein the support member is not formed on an upper surface of the liquid crystal display panel so that the entire upper surface of the liquid crystal display panel is not covered with the support member.

2. The display device according to claim 1, wherein the lateral side of the liquid crystal display panel confronts with the guide frame.

3. The display device according to claim 2,
wherein the set cover comprises a plate; and a sidewall extended and curved from one end of the plate, and
wherein the guide frame comprises a first guide confronting with the liquid crystal display panel and guiding the position of the liquid crystal display panel; and a first supporter extended from the first guide and supporting the lower surface of the liquid crystal display panel.

4. The display device according to claim 3, wherein a groove is formed in the first guide of the guide frame, and the sidewall of the set cover is received in the groove.

5. The display device according to claim 3,
wherein the guide frame further comprises:
a second guide extended from the first supporter while being provided to confront with the lateral side of the backlight unit and guiding the position of the backlight unit; and
a second supporter extended from the second guide and supporting the lower surface of the backlight unit.

6. The display device according to claim 1, wherein the lateral side of the liquid crystal display panel confronts with the set cover.

7. The display device according to claim 6,
wherein the guide frame further comprises:
a third supporter for supporting the lower surface of the liquid crystal display panel; and
a third guide extended from the third supporter and guiding a support cover.

8. The display device according to claim 6,
wherein the support member includes a support cover for guiding the position of the backlight unit,
wherein the support cover comprises:
a fourth supporter for supporting the lower surface of the backlight unit; and
a fourth guide extended from the fourth supporter while being provided to confront with the lateral side of the backlight unit and guiding the position of the backlight unit.

9. The display device according to claim 1,
wherein the liquid crystal display panel comprises a lower substrate, an upper substrate, a lower polarizing plate adhered to the lower surface of the lower substrate, and an upper polarizing plate adhered to the upper substrate of the upper substrate,
wherein the connection member is formed between the lower substrate of the liquid crystal display panel and the guide frame.

10. The display device according to claim 1, wherein the connection member is a both-sided tape.

11. The display device according to claim 1, wherein a protrusion is formed in any one of the set cover and guide frame, and a coupling groove to be coupled with the protrusion is formed in the remaining one.

12. The display device according to claim 1, further comprising a sealing member between the liquid crystal display panel and the support member.

13. The display device according to claim 12, wherein the sealing member comprises:
a head on from a predetermined portion of the upper surface of the liquid crystal display panel to a predetermined portion of the upper surface of the support member; and a head supporter extended from the head, and inserted into a gap between the lateral side of the liquid crystal display panel and the support member.

14. The display device according to claim 12, wherein the sealing member comprises:
   a head on from a predetermined portion of the upper surface of the liquid crystal display panel to a predetermined portion of the upper surface of the support member; and
   a head supporter extended from the head, and inserted into the support member.

15. The display device according to claim 12, wherein the sealing member is formed of a ring-shaped structure inserted into a gap between the liquid crystal display panel and the support member.

16. The display device according to claim 12, wherein the sealing member is formed of a film-shaped structure on from a predetermined portion of the upper surface of the liquid crystal display panel to a predetermined portion of the upper surface of the support member.

17. The display device according to claim 16, wherein the film-shaped structure is not extended to the edge of the support member.

18. The display device according to claim 17, wherein a groove is formed in the upper surface of the support member, and the film-shaped structure is received in the groove provided in the upper surface of the support member.

19. A display device comprising:
   a display unit for displaying images; and
   a support member for supporting the display unit, wherein the support member is not formed on the upper surface of the display unit,
   wherein the support member comprises a set cover for receiving the display unit, the set cover functioning as an external cover; and a guide frame for guiding the position of the display unit,
   wherein the guide frame and the display unit are connected with each other by a connection member provided therebetween,
   wherein the support member is not formed on an upper surface of the liquid crystal display panel so that the entire upper surface of the liquid crystal display panel is not covered with the support member.

* * * * *